United States Patent
Van ryzin et al.

(10) Patent No.: US 9,708,985 B1
(45) Date of Patent: Jul. 18, 2017

(54) MATCHING TORQUE MAP TO SHIFT PATTERN

(71) Applicants: Hyundai America Technical Center, Inc., Superior Township, MI (US); Hyundai Motor Company, Seoul (KR); Kia Motors Corporation, Seoul (KR)

(72) Inventors: Angeles Van ryzin, Pomona, CA (US); Jerome Gregeois, Claremont, CA (US)

(73) Assignees: Hyundai America Technical Center, Inc., Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/132,334

(22) Filed: Apr. 19, 2016

(51) Int. Cl.
*F02D 29/02* (2006.01)
*F02D 31/00* (2006.01)
*F16H 63/50* (2006.01)

(52) U.S. Cl.
CPC ........... *F02D 31/001* (2013.01); *F02D 29/02* (2013.01); *F16H 63/50* (2013.01)

(58) Field of Classification Search
CPC ........ F02D 29/02; F02D 31/00; F02D 31/001; F16H 63/50
See application file for complete search history.

(56) References Cited

U.S. PATENT DOCUMENTS

| | | | | |
|---|---|---|---|---|
| 4,733,581 A * | 3/1988 | Hasegawa | ............... | F16H 59/72 477/144 |
| 5,036,728 A * | 8/1991 | Kawasoe | ............. | B60W 10/06 477/107 |
| 6,671,601 B2 * | 12/2003 | Abiru | ................ | F16H 61/66254 477/107 |
| 6,827,167 B2 * | 12/2004 | Cikanek | ................... | B60K 6/48 180/65.6 |
| 7,194,344 B2 * | 3/2007 | Gee | ...................... | B60K 5/1283 180/312 |

FOREIGN PATENT DOCUMENTS

| | | |
|---|---|---|
| JP | 2007-278345 A | 10/2007 |
| JP | 5691386 B2 | 4/2015 |
| KR | 10-1172083 B1 | 8/2012 |

* cited by examiner

*Primary Examiner* — Hieu T Vo
(74) *Attorney, Agent, or Firm* — Mintz Levin Cohn Ferris Glovsky and Popeo, P.C.; Peter F. Corless

(57) ABSTRACT

A method includes: controlling a production of torque by an engine of a vehicle such that a first torque is produced in an $n^{th}$ gear prior to a downshift determined according to a gear shifting pattern of the vehicle, wherein the first torque is 100% of the engine's available torque at a given accelerator pedal position and a given engine revolutions per minute (RPM); calculating a second torque which causes a predefined increase in engine power output based on a first engine power output occurring as the engine produces the first torque at the given accelerator pedal position and the given RPM; and controlling the production of torque by the engine such that the second torque is produced in an $(n-1)^{th}$ gear after the downshift.

9 Claims, 9 Drawing Sheets

| APS | 1st | 2nd | 3rd | 4th | 5th | 6th | 7th | 8th |
|---|---|---|---|---|---|---|---|---|
| 10 | 1 | 1.2 | 1.3 | 1.5 | 1.55 | 1.6 | 1.7 | 1.9 |
| 20 | 1 | 1.15 | 1.3 | 1.45 | 1.5 | 1.55 | 1.65 | 1.8 |
| 40 | 1 | 1.1 | 1.2 | 1.4 | 1.45 | 1.5 | 1.6 | 1.7 |
| 60 | 1 | 1.1 | 1.1 | 1.3 | 1.35 | 1.45 | 1.55 | 1.6 |
| 80 | 1 | 1 | 1.1 | 1.2 | 1.3 | 1.4 | 1.5 | 1.5 |
| 100 | 1 | 1 | 1.1 | 1.1 | 1.2 | 1.4 | 1.5 | 1.4 |

FIG. 2

MATCHING TORQUE MAP TO SHIFT PATTERN

BACKGROUND (a) Technical Field

The present disclosure relates generally to vehicular control systems, and more particularly, to controlling a vehicle engine using an optimized torque map by matching the torque map to gear shifting patterns.

(b) Background Art

Generally, the term "engine map" refers to a set of one- or multi-dimensional parameter tables loaded into a vehicle control unit, e.g., electronic control unit (ECU), to control various engine parameters, such as throttle position/opening, injection and ignition timings (i.e., duration, phase, etc.), and the like. One such map—a "torque map"—allows an operator to manage the engine drivability through the redefinition of torque delivery by the vehicle's engine. The torque map is a two-dimensional table with engine speed (e.g., velocity or revolutions per minute (RPMs)) and throttle or accelerator pedal position measured using an accelerator pedal position sensor (APS) as inputs and torque as the output.

An operator can manipulate a vehicle's torque map to define the torque behavior of the vehicle. For instance, FIGS. 1A-1C illustrate exemplary hypothetical torque maps 100 resulting in different engine behaviors. Each torque map 100 includes multiple APS lines indicating a range of accelerator (or gas) pedal positions (e.g., 10% APS equates to the accelerator pedal being 10% depressed, 100% APS equates to the accelerator pedal fully depressed, etc.). Following a particular APS line and engine speed in RPMs (x-axis) as inputs, the torque map 100 outputs a corresponding amount of torque (y-axis).

As shown in FIG. 1A, the engine outputs a constant torque. That is, for all RPM values, the torque produced by the engine remains constant for a given APS. On the other hand, as shown in FIG. 1B, the engine outputs a constant power. As is known in the art, power is the product of torque multiplied by a rotational speed, in this case, RPM. Thus, as the RPMs of the engine increase, the torque produced by the engine decreases proportionally, and vice versa, so as to output a constant power. As a result, even as APS remains constant, the slope of the APS lines change due to the changing torque. As shown in FIG. 1C, a hybrid approach combining the constant torque and constant power torque maps can be used. Here, the torque strategy resembles constant torque at low- and high-RPMs and constant power at mid-RPMs. It should be apparent that vehicle torque maps can be shaped in a range of ways to affect the drive behavior of the vehicle, e.g., making the vehicle feel sportier, increasing the vehicle's hauling capabilities, etc.

Torque maps are formulated for each of the vehicle's gears. To this end, a base torque map can be defined (in first gear, for example), and a factor can be applied to the torque values in each APS position of the base map to establish torque maps in other gears. For instance, FIG. 2 illustrates an exemplary hypothetical torque map factor table 200 containing factors (the factor for first gear is 1, since first gear is the base torque map) by which to multiply the torque output at varying APS positions for each gear. Thus, after defined the base torque map in one gear, torque maps can be easily defined in subsequent gears using the factor table 200.

Meanwhile, gear shift patterns or schedules dictate the driving conditions under which a vehicle changes gears— either upshifting or downshifting. In automatic transmission vehicles, a vehicle control unit, e.g., a transmission control unit (TCU), can control the gear shifting based on throttle opening and vehicle speed/engine RPM as inputs. For instance, FIG. 3 illustrates an exemplary hypothetical gear shift pattern 300 showing shift shapes for each gear. Here, a vehicle gear is shifted according to the throttle opening and engine RPM. For a given throttle in a given gear, there is a unique vehicle speed at which a shift takes place. Notably, the gear shift pattern 300 depicts a downshift pattern, specifically; though the procedure operates similarly for upshifting.

Shift patterns are typically created taking into account fuel economy, engine capability, and performance drivability. In the gear shift pattern 300, fuel economy is considered by the minimum lines 310 in the shift pattern. Conversely, the maximum lines 320 are established knowing the engine's performance capability. Further, the mid-pedal region 330 can be adjusted to achieve a desired response or feel. Common practice involves adjusting a vehicle's shift pattern to address drivability concerns, such as sluggish acceleration where the vehicle does not adequately respond to a driver depressing the gas pedal, busy shifting, and the like.

Like manipulation of a vehicle torque map, manipulation of a gear shift pattern can modify the drive behavior of a vehicle. However, adjusting the torque map without regard for the gear shift pattern, or vice versa, can create drivability issues, mainly due to the gear ratios. For instance, engine response can feel sluggish during accelerator pedal tip-in due to torque saturation (i.e., the engine has reached the maximum amount of available torque in a current gear). That is, the driver cannot feel a level of acceleration in the vehicle's current gear. The problem arises because there is no feeling of torque reserve in all gears. Also, after a downshift, the immediate acceleration response can feel excessive and jolt the driver and passengers. The result is a driving experience that feels discontinuous and unpredictable.

SUMMARY OF THE DISCLOSURE

The present disclosure provides techniques for matching a vehicle torque map to gear shift patterns in order to preserve a reserve of power in the vehicle's engine, preventing the sensation of sluggish response during acceleration and uneven response during a downshift. The present disclosure combines torque map and shift pattern concepts to achieve improved drivability. The shift pattern-optimized torque map disclosed herein provides for enhanced responsiveness and prevents a phenomenon of dead response before a downshift followed by excessive acceleration after a downshift. The result is a drive behavior with smoother acceleration and greater predictability.

According to embodiments of the present disclosure, a method includes: controlling a production of torque by an engine of a vehicle such that a first torque is produced in an $n^{th}$ gear prior to a downshift determined according to a gear shifting pattern of the vehicle, wherein the first torque is 100% of the engine's available torque at a given accelerator pedal position and a given engine revolutions per minute (RPM); calculating a second torque which causes a predefined increase in engine power output based on a first engine power output occurring as the engine produces the first torque at the given accelerator pedal position and the given RPM; and controlling the production of torque by the engine such that the second torque is produced in an $(n-1)^{th}$ gear after the downshift.

The calculating of the second torque may include: determining a first engine power output occurring as the engine produces the first torque at the given RPM; calculating a second engine power output equivalent to the first engine power output increased by the predetermined increase in engine power output; and calculating the second torque based on the second engine power output.

The given accelerator pedal position may be between approximately 30% and approximately 70% depressed, and the given engine RPM may be between approximately 500 RPM and approximately 4,000 RPM.

The method may further include: shaping a torque line of a vehicle torque map for the $n^{th}$ gear based on the first torque; and shaping a torque line of a vehicle torque map for the $(n-1)^{th}$ gear based on the second torque.

Additionally, the method may further include: determining a plurality of the first torques corresponding to a plurality of points on the gear shifting pattern for the $n^{th}$ gear; forming a vehicle torque map including a plurality of torque lines for the $n^{th}$ gear, the plurality of torque lines shaped based on the plurality of determined first torques; calculating a plurality of the second torques corresponding to a plurality of points on the gear shifting pattern for the $(n-1)^{th}$ gear; and forming a vehicle torque map including a plurality of torque lines for the $(n-1)^{th}$ gear, the plurality of torque lines shaped based on the plurality of calculated second torques.

The predefined increase in engine power output may be defined by an operator. The predefined increase in engine power output may be an increase of between approximately 5% and approximately 30%.

Furthermore, according to embodiments of the present disclosure, a system includes: an engine of a vehicle configured to produce torque resulting in motion of the vehicle; and a control unit of the vehicle that is configured to: control a production of torque by the engine such that a first torque is produced in an $n^{th}$ gear prior to a downshift determined according to a gear shifting pattern of the vehicle, wherein the first torque is 100% of the engine's available torque at a given accelerator pedal position and a given engine revolutions per minute (RPM); calculate a second torque which causes a predefined increase in engine power output based on a first engine power output occurring as the engine produces the first torque at the given accelerator pedal position and the given RPM; and control the production of torque by the engine such that the second torque is produced in an $(n-1)^{th}$ gear after the downshift.

Furthermore, according to embodiments of the present disclosure, a non-transitory computer readable medium containing program instructions for performing a method includes: program instructions that control a production of torque by an engine of a vehicle such that a first torque is produced in an $n^{th}$ gear prior to a downshift determined according to a gear shifting pattern of the vehicle, wherein the first torque is 100% of the engine's available torque at a given accelerator pedal position and a given engine revolutions per minute (RPM); program instructions that calculate a second torque which causes a predefined increase in engine power output based on a first engine power output occurring as the engine produces the first torque at the given accelerator pedal position and the given RPM; and program instructions that control the production of torque by the engine such that the second torque is produced in an $(n-1)^{th}$ gear after the downshift.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 2 illustrates an exemplary hypothetical torque map factor table containing adjustment factors;

Figure 1C:
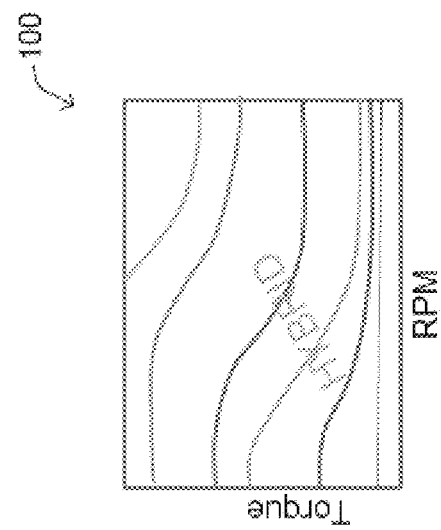
FIGS. 1A-1C illustrate exemplary hypothetical torque maps resulting in different engine behaviors.
Figure 1B:
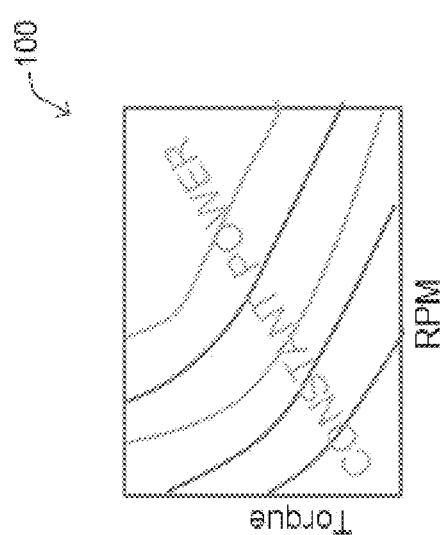
Figure 1A:
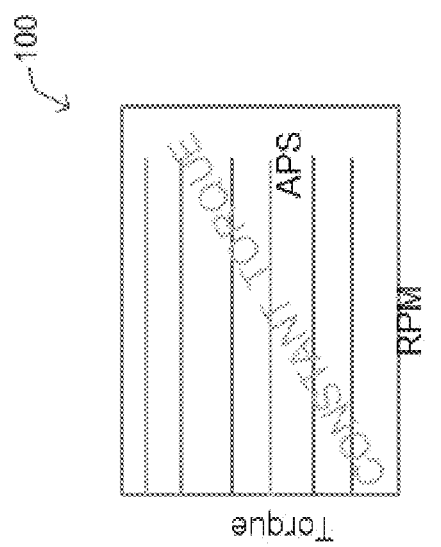
Figure 3:
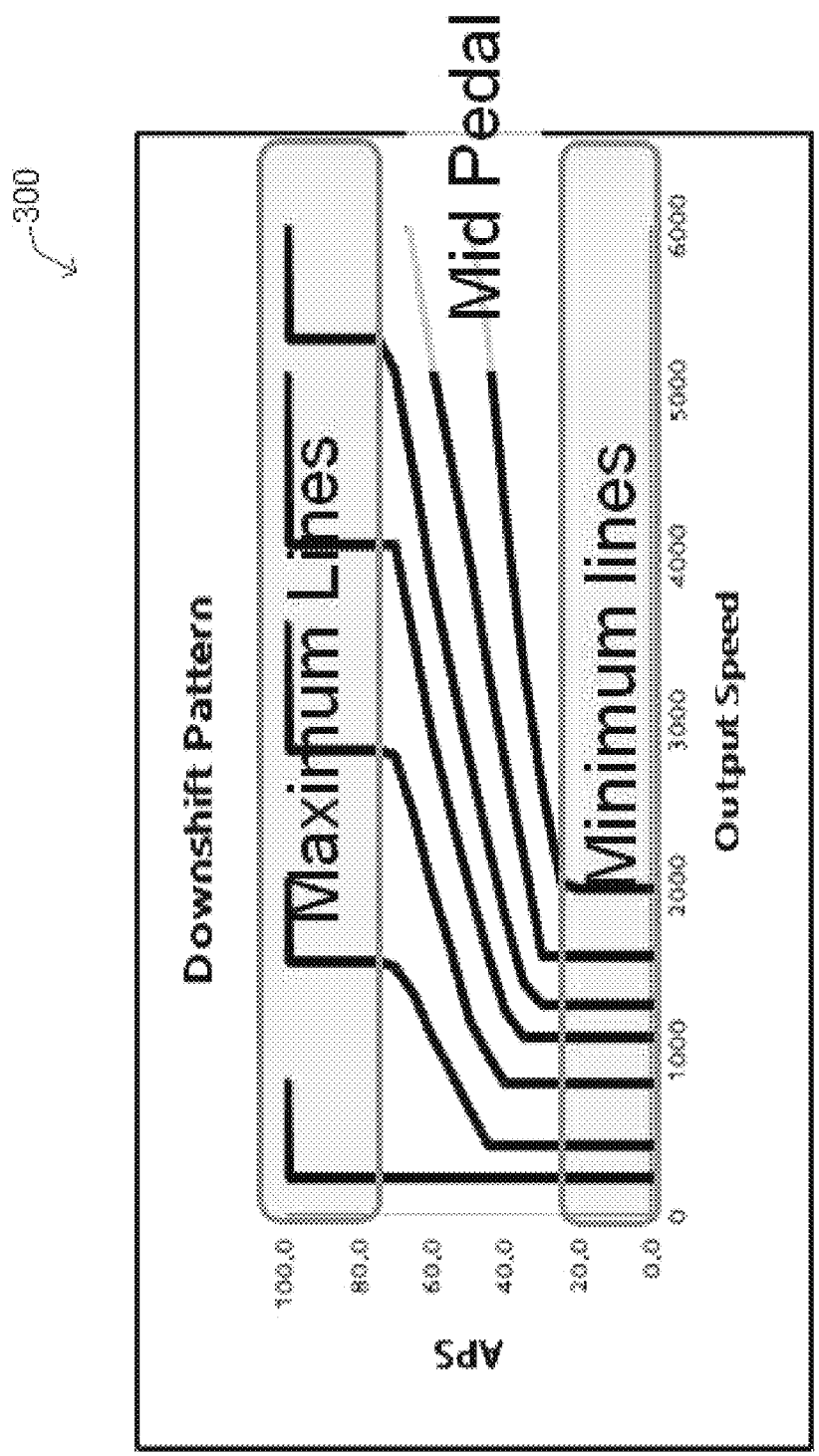
FIG. 3 illustrates an exemplary hypothetical gear shift pattern showing shift shapes for each gear.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the control unit in conjunction with one or more additional components, as described in detail below.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to embodiments of the present disclosure, the disclosed techniques optimize a vehicle's torque map by matching the torque map to the vehicle's gear shifting pattern. In particular, the torque map can be matched to a downshift pattern (the torque map can be matched to an upshift pattern, as well). Reshaping the torque map in each gear according to the shifting pattern, as discussed herein, involves utilizing 100% of the engine's available torque at a given accelerator pedal position and RPM prior to a downshift determined according to the gear shifting pattern of the vehicle. After the downshift, a torque is calculated and produced such that there is a predefined increase in engine power output. The predefined increase in engine power output can be determined by the operator and can change based on the application and/or the preference of the operator. Optimizing the torque map in this manner ensures that there is no sluggish response in any gear, as a reserve of power is continually maintained.

Figure 4:
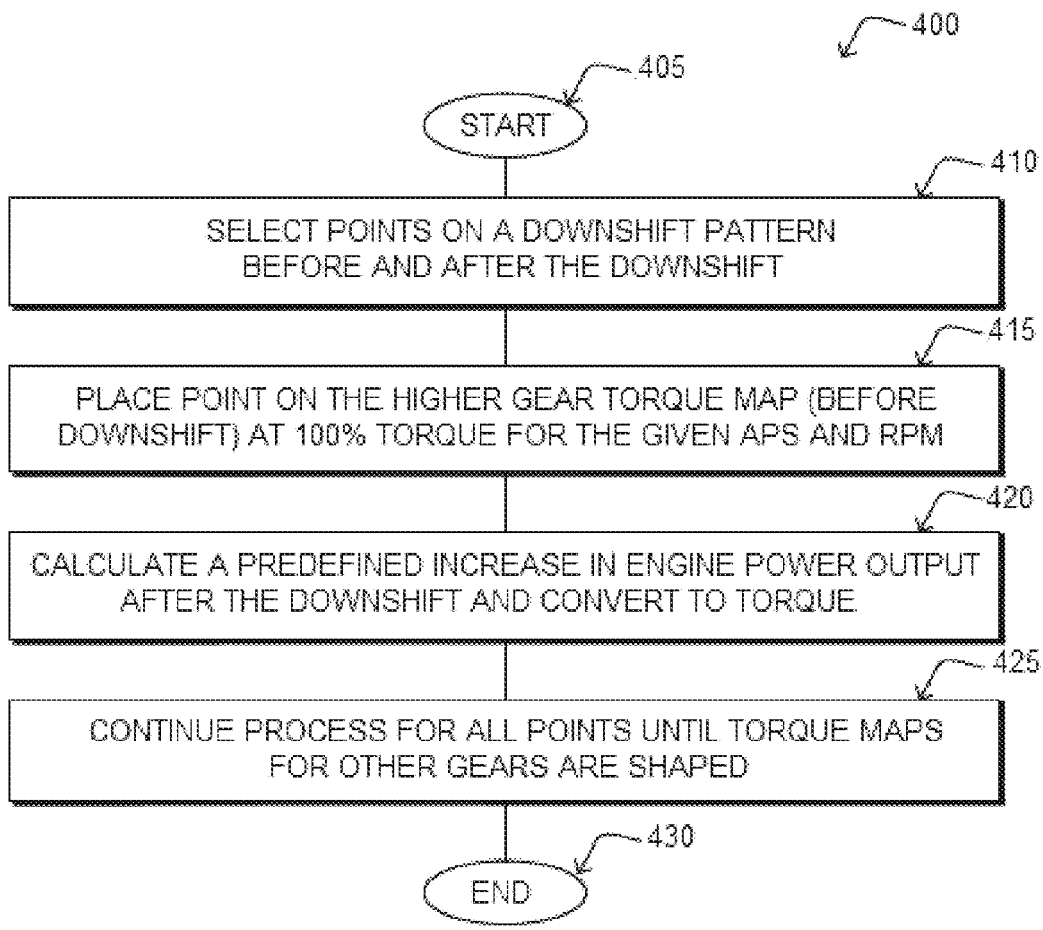
FIG. 4 illustrates an exemplary simplified procedure for matching a torque map to shift patterns.

FIG. 4 illustrates an exemplary simplified procedure for matching a torque map to shift patterns. The procedure 400 may start at step 405, and continue to step 410, where, as described in greater detail herein, an iterative process is performed to reshape the vehicle torque map in each gear according to the vehicle's downshift pattern.

In step 410, multiple points on a vehicle's downshift pattern are selected. For instance, as demonstrated in FIG. 9, points on the downshift pattern before and after a designated downshifting event should be selected. Points can be extracted from the higher gear shifting line (pre-downshift) and from the lower gear shifting line (post-downshift), as demonstrated in FIG. 9.

Figure 9:
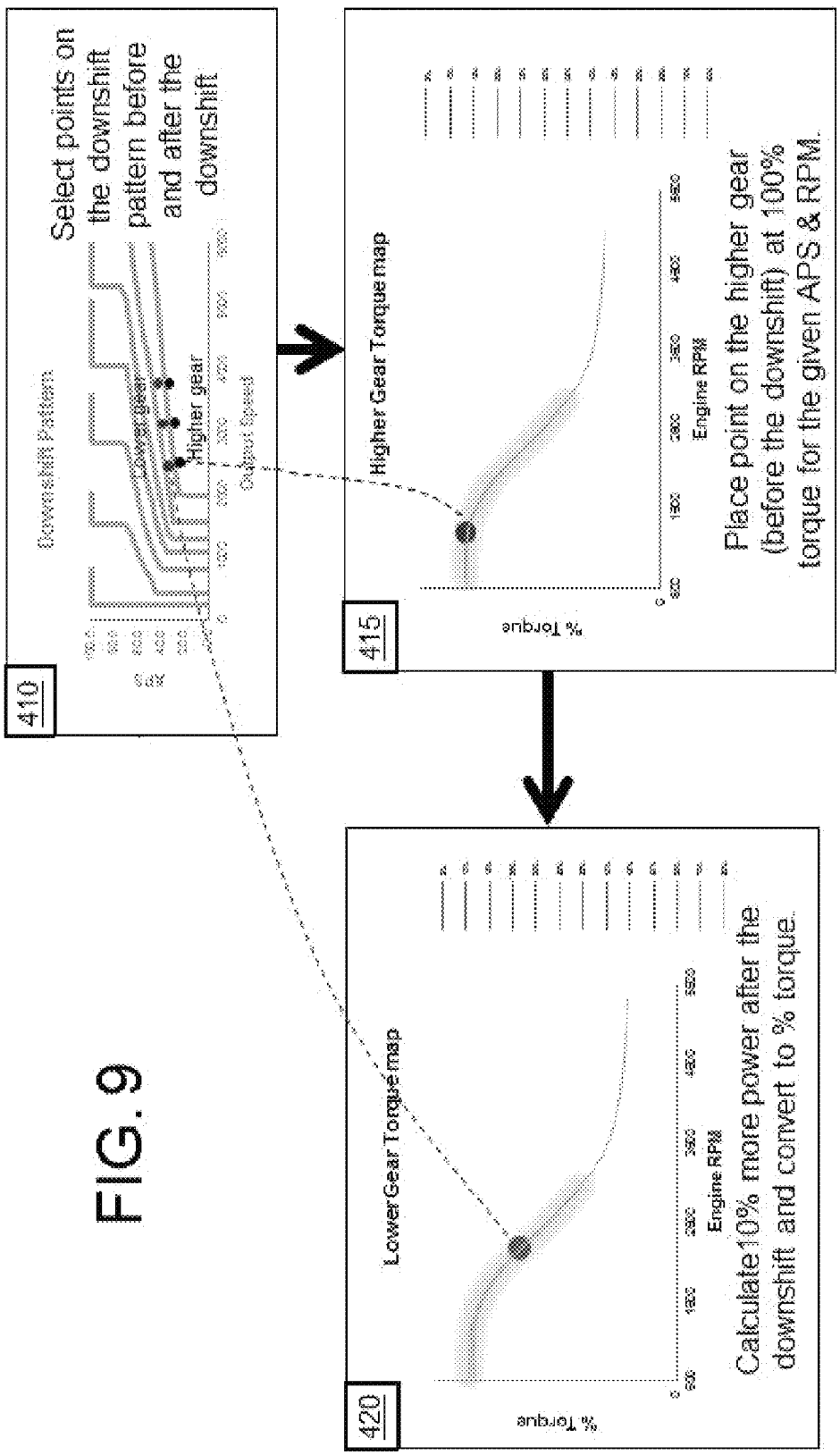
FIG. 9 illustrates an exemplary diagrammatic flowchart of the procedure for matching a torque map to shift patterns shown in FIG. 4.

In step 415, a selected point from the higher gear in the downshift pattern is placed on the torque map of the corresponding gear (i.e., the higher gear), as demonstrated in FIG. 9. The torque map of the higher gear is shaped by mapping the selected point on the torque map such that 100% of the engine's available torque, given the corresponding accelerator pedal position measured using an accelerator pedal position sensor (APS) and engine RPM of the selected point, is produced before a downshift determined according to the downshifting pattern takes place. For the purposes of the present disclosure, the torque which is 100% of the engine's available torque, given the corresponding accelerator pedal position and RPM, before the downshift can be referred to as the "first torque."

In step 420, a selected point from the lower gear in the downshift pattern is placed on the torque map of the corresponding gear (i.e., the lower gear), as demonstrated in FIG. 9. The torque map of the lower gear is shaped by mapping the selected point on the torque map such that a torque causing a predefined increased in engine power output is produced after the downshift determined according to the downshifting pattern takes place. That is, upon determining a first engine power output occurring as the engine produces the first torque at the given accelerator pedal position and RPM, and a second engine power output equivalent to the first engine power output increased by a predetermined amount can be calculated.

The predetermined increase in engine power output can be determined by the operator and can change based on the application and/or the preference of the operator. In general, a relatively higher increase in engine power output may be applied to a low displacement engine, whereas a relatively lower increase in engine power output may be applied to a high displacement engine. For instance, the operator can define an increase of between approximately 5% to approximately 30% in engine power output, depending on the intentions of the operator and/or the specifications of the vehicle at-issue. Notably, the figures refer to a 10% increase in engine power output; however, this number is provided merely for demonstration purposes and should not be treated as limiting the scope of the claimed invention thereto.

Based on the calculated second engine power output, the torque which results in the second engine power output, which may be a 10% increase in power in this particular example, given the corresponding accelerator pedal position and engine RPM of the selected point, is produced after the downshift takes place. For the purposes of the present disclosure, the torque resulting from the predetermined increase in power, given the corresponding accelerator pedal position and RPM, after the downshift can be referred to as the "second torque."

In step 425, the torque map shaping process can be continued iteratively for all points on the downshift pattern until torque maps for the higher and lower gears, as well as the remaining gears, are shaped. In some cases, it may not be necessary to reshape the torque maps of low gears (e.g., first and second gear); thus, it may only be necessary to shape the torque maps of third gear and higher.

Figure 5:
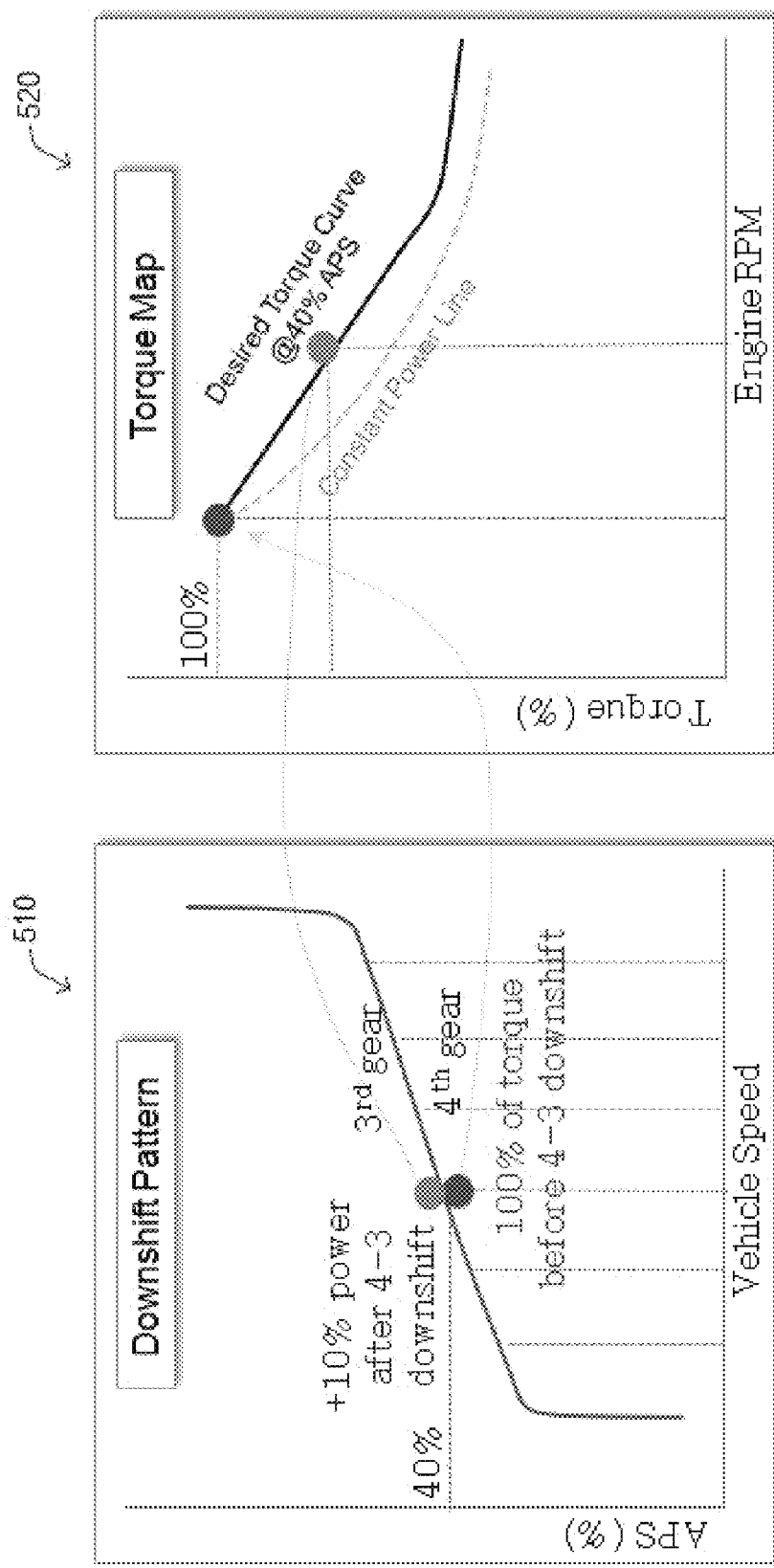
FIG. 5 illustrates an exemplary diagrammatic depiction of the downshift pattern-torque map relationship.

In greater detail, FIG. 5 illustrates an exemplary diagrammatic depiction of the downshift pattern-torque map relationship discussed herein. A torque map 520 can be matched to a downshift pattern 510 by selecting a point on the downshift pattern 510 and mapping the selected point to the torque map 520 based on whether the timing of the selected point is before or after a downshifting event. As shown in FIG. 5, in the case of a downshift from fourth to third gear, a point on a downshift pattern line for fourth gear (i.e., pre-downshift) can be mapped to the torque map 520 such that 100% of the engine's available torque, given the accelerator pedal position (i.e., throttle opening or position) and engine RPM corresponding to the point that is selected in the downshift pattern 510, is produced before the downshift occurs. Then, a point on a downshift pattern line for third gear (i.e., post-downshift) can be mapped to the torque map 520 such that a torque causing a predefined increase in engine power output, given the accelerator pedal position and engine RPM corresponding to the point that is selected in the downshift pattern 510, is produced after the downshift occurs. As explained above, the predefined increase in engine power output can be determined by the operator and can change based on the application and/or the preference of the operator. Also, the operator can define the increase as between approximately 5% and approximately 30%, or in one particular example, approximately 10%, as shown in FIG. 5.

As a result, a desired torque curve at a given accelerator pedal position-40% in this particular example—is defined in the torque map 520 for a particular gear. The torque curve can be defined in the torque map 520 by performing the calculations described above in an iterative manner for several points on the downshift pattern 510 for all gears (or a subset of all gears). After the torque curve for each gear has been shaped, a point on the curve for any given (APS, RPM) pair in any gear may represent a torque value corresponding to either 100% of the engine's available torque or a torque causing a predefined increase in engine power output, depending on whether the point is pre-downshift or post-downshift.

Furthermore, a constant power line is shown in the torque map 520. As is known in the art, power represents the product of torque multiplied by a rotational speed (in this case, RPMs). Thus, with respect to power, torque and RPMs are inversely proportional to one another. As shown in FIG. 5, the point on the downshift pattern line for third gear (i.e., post-downshift) is mapped to the torque map 520 on a positive side of the constant power line. This indicates a torque that causes an increase in engine power output over the point mapped to the torque map 520 from the downshift pattern line for fourth gear (i.e., pre-downshift).

Figure 6B:
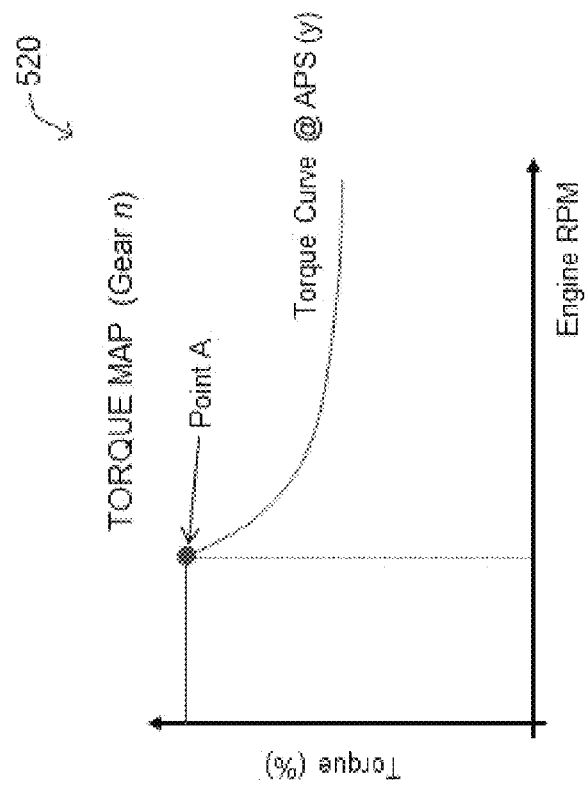
FIGS. 6A, 6B, 7A and 7B illustrate an exemplary process for optimizing the engine torque map according to the gear shifting pattern.
Figure 6A:
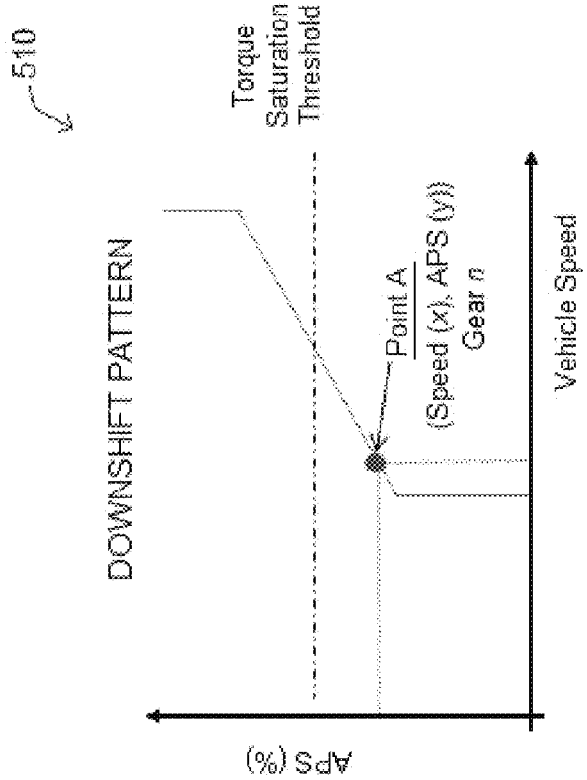

Along these lines, FIGS. 6A, 6B, 7A and 7B illustrate an exemplary process for optimizing the engine torque map according to the gear shifting pattern. As shown in FIGS. 6A and 6B, the torque map 520 for gear n can be shaped for 100% of the engine's available torque requested before a downshift. Initially, a point on the downshift pattern (Point A) for gear n can be selected. Each point on the downshift pattern 510 represents a (vehicle speed, APS) coordinate. In FIG. 6A, Point A corresponds to a vehicle speed of x and an APS of y.

In FIG. 6B, the torque map 520 for gear n is shaped according to Point A on the downshift pattern 510. Particularly, the torque map 520 is shaped such that 100% of the engine's available torque (i.e., first torque) is produced at Point A (vehicle speed: x, APS: y). Thus, by repeating this process in an iterative manner, as explained in step 425 in FIG. 4, a torque curve for APS y in gear n can be defined such that 100% of available torque given APS y and a given RPM is produced before a downshift event occurs. This process can also be repeated for multiple accelerator pedal position values in each gear to define a complete torque mapping for each gear, as demonstrated in FIG. 8.

Figure 7B:
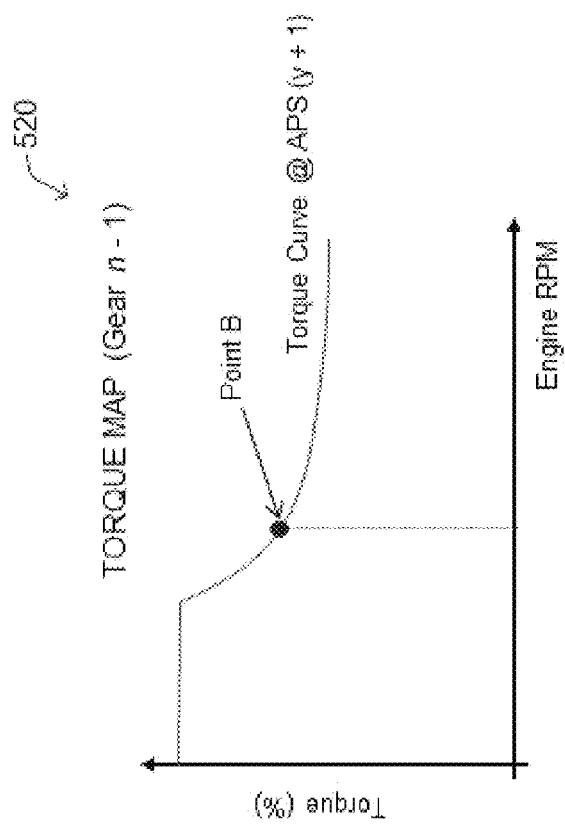
Figure 7A:
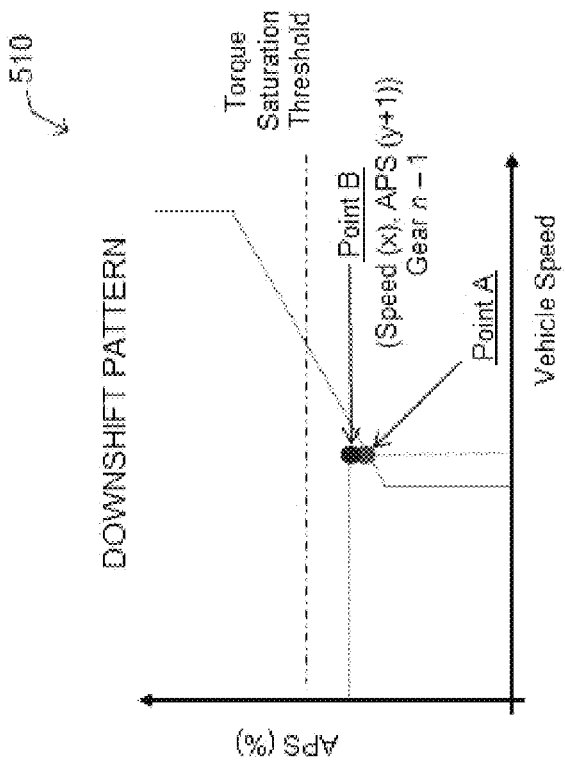

As shown in FIGS. 7A and 7B, the torque map 520 for gear n−1 can be shaped for torque resulting in a predetermined increase in engine power output after the downshift. Initially, a point on the downshift pattern (Point B) for gear n−1 can be selected. As discussed above, each point on the downshift pattern 510 represents a (vehicle speed, APS) coordinate. In FIG. 7A, Point B corresponds to a vehicle speed of x and an APS of y+1.

In FIG. 7B, the torque map 520 for gear n is shaped according to Point A on the downshift pattern 510. Particularly, the torque map 520 is shaped such that a torque causing a predefined increase in engine power output (i.e., second torque) is produced at Point B (vehicle speed: x, APS: y+1). In this regard, the operator or a control unit (not shown), such as the vehicle's electronic control unit (ECU), can calculate the second torque by determining a first engine power output occurring as the engine produces the torque at Point A in gear n (i.e., the first torque), calculating a second engine power output equivalent to the first engine power output increased by the predetermined increase in engine power output—defined by the operator—and finally deriving the second torque which causes the increase in engine power based on the calculated second engine power output (knowing that power is equal to the product of torque multiplied by RPMs).

Consequently, a torque curve for APS y+1 in gear n−1 can be defined such that a torque causing a predefined increase, as defined herein, in engine output power is produced after the downshift event occurs. Therefore, the engine power output corresponding to Point B on the torque map 520 for gear n−1 is greater than the engine power output corresponding to Point A on the torque map for gear n.

The calculations discussed above for deriving the second torque can be repeated in an iterative manner, as explained in step 425 in FIG. 4, for other gears and for various points along the downshift pattern 510 (e.g., various APS values) in each gear. In some cases, the torque map shaping process can be limited to a particular range of metrics. For instance, the torque map 520 shaping can be limited to an accelerator pedal position of between approximately 30% and approximately 70% depressed. Similarly, the torque map 520 shaping can be limited to engine RPMs of between approximately 500 RPM and approximately 4,000 RPM. The torque map shaping can be limited or not based on the preferences of the designer, e.g., to reduce calculation time, to redefine a vehicle's torque delivery in specific circumstances, such as low, medium, and/or high throttle tip-in, low, medium, and/or high RPMs, and so forth.

Referring back to FIG. 4, the procedure 400 illustratively ends at step 430. The techniques by which the steps of procedure 400 may be performed, as well as ancillary procedures and parameters, are described in detail above.

It should be noted that the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 8:
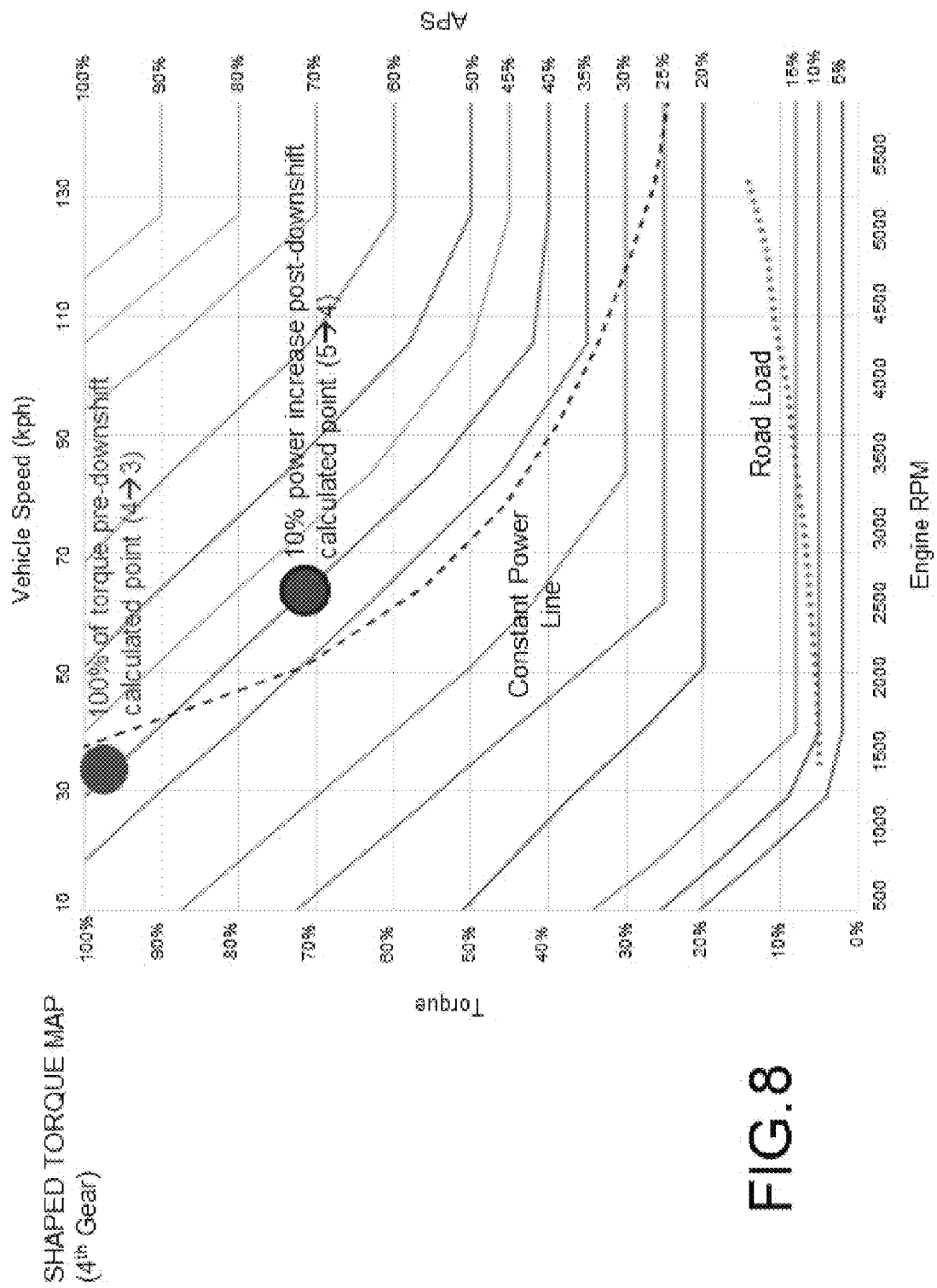
FIG. 8 illustrates an exemplary torque map shaped according to gear shifting patterns.

Referring now to FIG. 8, FIG. 8 illustrates an exemplary torque map shaped according to gear shifting patterns. As shown in FIG. 8, a shaped vehicle torque map for fourth gear includes a plurality of torque lines corresponding to accelerator pedal position values ranging from 5% to 100%. Using the shaped torque map, the engine can deliver a torque as output based on an inputs including an accelerator pedal position value and engine RPM. It should be noted that the slope, shape, length, position, and the like of the depicted torque map lines in FIG. 8 are provided for demonstration purposes only and should not be treated as limiting the present disclosure. Rather, the torque map shown in FIG. 8 can be modified in any suitable manner according to the particular vehicle, the capabilities of the engine, the designer's preferences, etc.

As explained above, the torque map shown in FIG. 8 can be shaped by iteratively performing the torque calculations described herein for all gears (or a subset of gears) and for multiple accelerator pedal position values in each gear. The result is a torque map which instructs an engine to deliver a first torque that is 100% of available torque for a given accelerator pedal position and RPM prior to a downshift a second torque that causes a predefined increase in engine power output after the downshift.

In the shaped torque map, two points in particular are shown. First, a pre-downshift point is shown on the lesser side of the constant power line. As explained above, the pre-downshift point represents a first torque that is 100% of the engine's available torque given the corresponding accelerator pedal position and engine RPM before a downshift (i.e., from fourth to third gear). As shown in FIG. 8, the pre-downshift point corresponds to 40% APS and approximately 1500 RPMs.

Second, a post-downshift point is shown on the greater side of the constant power line. As explained above, the post-downshift point represents a second torque that causes a predefined increase in power output by the engine after a downshift (i.e., from fifth to fourth gear). The predefined increase in engine power output can be determined by the operator and can change based on the application and/or the preference of the operator. In general, a relatively higher increase in engine power output may be applied to a low displacement engine, whereas a relatively lower increase in engine power output may be applied to a high displacement engine. For instance, the operator can define an increase of between approximately 5% to approximately 30% in engine power output, depending on the intentions of the operator and/or the specifications of the vehicle at-issue. As shown in FIG. 8, the post-downshift point corresponds to 40% APS and approximately 2500 RPMs. In this particular example, the power output by the engine corresponding to the post-downshift point is approximately 10% greater than the power output by the engine corresponding to the pre-downshift point.

Advantageously, the techniques for optimizing a vehicle torque map described herein utilize the vehicle's gear shifting patterns to maintain a reserve of torque for the driver and avoid sluggish acceleration, or sluggish response, due to torque saturation. Thereby, the drivability of the vehicle can be enhanced, enabling greater RPM controllability (chassis dynamics), a linear feel during multiple gear kick-down, and the ability to strongly pull into a desired gear. The resultant progressive acceleration during a downshift allows for a more predictable vehicle response to manipulation of the accelerator pedal. Additionally, with the optimized torque maps described herein, higher downshift lines can be used in the vehicle's shifting patterns, consequently reducing shift "busyness."

While there have been shown and described illustrative embodiments that provide for optimizing a vehicle torque map by matching the torque map to a gear shifting pattern, it is to be understood that various other adaptations and modifications may be made within the spirit and scope of the embodiments herein. For instance, while torque map lines and gear shifting lines are discussed herein and depicted throughout the drawings (e.g., FIGS. 5-9), the depicted lines are provided merely for demonstration of the disclosed embodiments and should not be treated as limiting the present disclosure to the depicted lines. That is, the slope, shape, length, position, and the like of the depicted torque map lines and gear shifting lines are provided merely for demonstration purposes and, as would be understood by a person of ordinary skill in the art, can be modified in accordance with a given vehicle, engine, or designer's preferences. Further, the power increase amount can be suitably modified according to the preferences of the designer; thus, mention of a particular increase in engine power output herein should not be treated as limiting the claimed invention thereto. Therefore, the embodiments of the present disclosure may be modified in a suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   an engine of a vehicle configured to produce torque resulting in motion of the vehicle; and
   a control unit of the vehicle that is configured to:
   control a production of torque by the engine such that a first torque is produced in an $n^{th}$ gear prior to a downshift determined according to a gear shifting pattern of the vehicle,
   wherein the first torque is 100% of the engine's available torque at a given accelerator pedal position and a given engine revolutions per minute (RPM);
   calculate a second torque which causes a predefined increase in engine power output based on a first engine power output occurring as the engine produces the first torque at the given accelerator pedal position and the given RPM; and
   control the production of torque by the engine such that the second torque is produced in an $(n-1)^{th}$ gear after the downshift.

2. A non-transitory computer readable medium containing program instructions for performing a method, the computer readable medium comprising:
   program instructions that control a production of torque by an engine of a vehicle such that a first torque is produced in an $n^{th}$ gear prior to a downshift determined according to a gear shifting pattern of the vehicle,
   wherein the first torque is 100% of the engine's available torque at a given accelerator pedal position and a given engine revolutions per minute (RPM);
   program instructions that calculate a second torque which causes a predefined increase in engine power output based on a first engine power output occurring as the engine produces the first torque at the given accelerator pedal position and the given RPM; and
   program instructions that control the production of torque by the engine such that the second torque is produced in an $(n-1)^{th}$ gear after the downshift.

3. A method comprising:
   controlling a production of torque by an engine of a vehicle such that a first torque is produced in an $n^{th}$ gear prior to a downshift determined according to a gear shifting pattern of the vehicle,
   wherein the first torque is 100% of the engine's available torque at a given accelerator pedal position and a given engine revolutions per minute (RPM);
   calculating a second torque which causes a predefined increase in engine power output based on a first engine power output occurring as the engine produces the first torque at the given accelerator pedal position and the given RPM; and controlling the production of torque by the engine such that the second torque is produced in an $(n-1)^{th}$ gear after the downshift.

4. The method of claim 3, wherein the calculating of the second torque comprises:
   determining the first engine power output occurring as the engine produces the first torque at the given accelerator pedal position and the given RPM;
   calculating a second engine power output equivalent to the first engine power output increased by the predetermined increase in engine power output; and
   calculating the second torque based on the second engine power output.

5. The method of claim 3, wherein the given accelerator pedal position is between approximately 30% and approximately 70% depressed, and the given engine RPM is between approximately 500 RPM and approximately 4,000 RPM.

6. The method of claim 3, further comprising:
   shaping a torque line of a vehicle torque map for the $n^{th}$ gear based on the first torque; and
   shaping a torque line of a vehicle torque map for the $(n-1)^{th}$ gear based on the second torque.

7. The method of claim 3, further comprising:
   determining a plurality of the first torques corresponding to a plurality of points on the gear shifting pattern for the $n^{th}$ gear;
   forming a vehicle torque map including a plurality of torque lines for the $n^{th}$ gear, the plurality of torque lines shaped based on the plurality of determined first torques;
   calculating a plurality of the second torques corresponding to a plurality of points on the gear shifting pattern for the $(n-1)^{th}$ gear; and
   forming a vehicle torque map including a plurality of torque lines for the $(n-1)^{th}$ gear, the plurality of torque lines shaped based on the plurality of calculated second torques.

8. The method of claim 3, wherein the predefined increase in engine power output is defined by an operator.

9. The method of claim 3, wherein the predefined increase in engine power output is an increase of between approximately 5% and approximately 30%.

* * * * *